(12) United States Patent
Jang

(10) Patent No.: US 11,597,385 B2
(45) Date of Patent: Mar. 7, 2023

(54) AUTONOMOUS VEHICLE AND VEHICLE RUNNING CONTROL METHOD USING THE SAME

(71) Applicants: HYUNDAI MOTOR COMPANY, Seoul (KR); KIA MOTORS CORPORATION, Seoul (KR)

(72) Inventor: Jae Hwan Jang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 85 days.

(21) Appl. No.: 16/535,654

(22) Filed: Aug. 8, 2019

(65) Prior Publication Data
US 2020/0189592 A1    Jun. 18, 2020

(30) Foreign Application Priority Data
Dec. 18, 2018    (KR) .......................... 10-2018-0164599

(51) Int. Cl.
  *G05D 1/00*    (2006.01)
  *B60W 30/18*    (2012.01)
(52) U.S. Cl.
  CPC .......... *B60W 30/18* (2013.01); *G05D 1/0088* (2013.01); *B60W 2554/803* (2020.02); *B60W 2554/804* (2020.02); *B60W 2720/106* (2013.01); *B60W 2720/12* (2013.01); *G05D 2201/0213* (2013.01)

(58) Field of Classification Search
  CPC .......... B60W 30/18; B60W 2554/803; B60W 2554/804; B60W 2720/12; B60W 2720/106; G05D 1/0088; G05D 2201/0213
  See application file for complete search history.

(56) References Cited

U.S. PATENT DOCUMENTS

| 7,444,241 | B2 | 10/2008 | Grimm |
| 9,412,277 | B2 | 8/2016 | Nath et al. |
| 9,428,187 | B2* | 8/2016 | Lee .................. B60W 30/10 |
| 2017/0010618 | A1* | 1/2017 | Shashua ............ G01C 21/165 |
| 2021/0237769 | A1* | 8/2021 | Ostafew .......... G06K 9/00805 |

FOREIGN PATENT DOCUMENTS

KR    10-2016-0047268 A    5/2016

* cited by examiner

Primary Examiner — Elaine Gort
Assistant Examiner — Chanmin Park
(74) Attorney, Agent, or Firm — Lempia Summerfield Katz LLC

(57) ABSTRACT

A vehicle running control method includes: calculating, by a controller, a lateral velocity of an adjacent vehicle that travels in a lane adjacent to a traveling lane in which an autonomous vehicle travels in the road-width direction, and a longitudinal velocity of the adjacent vehicle in the direction in which the adjacent lane extends; specifying, by the controller, a predetermined road section based on the longitudinal velocity and calculating a first path on the assumption that an offset distance of the adjacent vehicle in the adjacent lane in the road-width direction is maintained within the road section; and applying, by the controller, the lateral velocity to the first path to calculate a second path corresponding to a predicted traveling path of the adjacent vehicle.

7 Claims, 8 Drawing Sheets

AUTONOMOUS VEHICLE AND VEHICLE RUNNING CONTROL METHOD USING THE SAME

CROSS-REFERENCE TO RELATED APPLICATION

This application claims priority to and the benefit of Korean Patent Application No. 10-2018-0164599, filed on Dec. 18, 2018, the entire contents of which are incorporated herein by reference.

FIELD

The present disclosure relates to an autonomous vehicle and a vehicle running control method using the same.

BACKGROUND

The statements in this section merely provide background information related to the present disclosure and may not constitute prior art.

General lane changing technology is merely configured such that, when a driver shows his/her intention to change lanes (for example, when the driver turns on a turn signal lamp), it is determined whether it is possible to change lanes within a predetermined time, and the lane change is performed upon determining that it is possible to change lanes.

Additionally, in most research on autonomous traveling, the lane change is performed only when it is possible to change lanes, for example, when a path that makes it possible to avoid a collision is generated. Furthermore, level-4 autonomous traveling must be designed such that traveling is possible from the current position to a destination without the intervention of a driver under limited operational design domain (ODD) conditions, unlike level-2 autonomous traveling (ADAS system). Therefore, general lane-changing technology has difficulty in satisfying the requirements of the level-4 autonomous traveling.

We have found that a general autonomous vehicle predicts the traveling path of an adjacent vehicle based on the relative velocity of the adjacent vehicle measured through a distance sensor, rather than in consideration of information about a traveling lane and boundary lines. As a result, it is not possible to determine whether the lane change will occur in various road situations (for example, an intersection and a curved road) or to accurately predict the time at which the lane change will occur and the location at which the lane change will occur. Consequently, it is possible only to passively respond to such situations through abrupt deceleration, rather than flexibly responding to such situations.

SUMMARY

The present disclosure provides an autonomous traveling control method that is capable of estimating a traveling path based on the longitudinal velocity and the lateral velocity of an adjacent vehicle (i.e., a vehicle travelling adjacent to a host vehicle), which is calculated with reference to a traveling lane or a road shape, whereby it is possible to more accurately predict whether the traveling lane of the adjacent vehicle will be changed, and a vehicle using the same.

Objects of the present disclosure devised to solve the problems are not limited to the aforementioned object, and other unmentioned objects will be clearly understood by those skilled in the art based on the following detailed description of the present disclosure.

In one form of the present disclosure, a vehicle running control method includes: calculating, by a controller, the lateral velocity of an adjacent vehicle that travels in a lane adjacent to a traveling lane in which an autonomous vehicle travels in the road-width direction and the longitudinal velocity of the adjacent vehicle in the direction in which the adjacent lane extends; specifying, by the controller, a predetermined road section based on the longitudinal velocity and calculating, by the controller, a first path based on the assumption that the offset distance of the adjacent vehicle in the adjacent lane in the road-width direction is maintained within the predetermined road section; and applying, by the controller, the lateral velocity to the first path to calculate a second path, which corresponds to a predicted traveling path of the adjacent vehicle.

The first path may be calculated based on map information including a plurality of dots indicative of boundary lines of each of the traveling lane, and the adjacent lane and the center between the boundary lines.

The vehicle running control method may further include tracking the second path to determine whether the second path intersects a boundary line between the traveling lane and the adjacent lane and predicting a cut-in point of the adjacent vehicle based on an intersection point between the second path and the boundary line.

The vehicle running control method may further include controlling the driving of the autonomous vehicle based on the time desired for each of the autonomous vehicle and the adjacent vehicle to arrive at the predicted cut-in point.

The step of controlling the driving of the autonomous vehicle may include: accelerating the autonomous vehicle when a first arrival time of the autonomous vehicle exceeds a second arrival time of the adjacent vehicle; and determining that the adjacent vehicle is a vehicle having the potential to cut in (hereinafter, simply referred to as a "potential cut-in vehicle"); and decelerating the autonomous vehicle when the first arrival time of the autonomous vehicle is equal to or less than the second arrival time of the adjacent vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
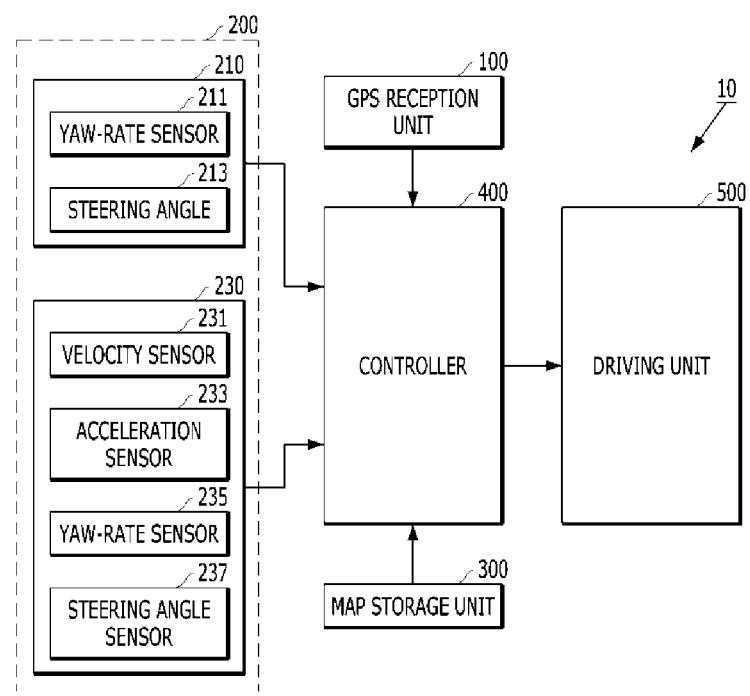
FIG. 1 is a schematic block diagram showing an autonomous vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since the exemplary forms of the present disclosure may be variously modified and may have various forms, it should be understood that the present disclosure includes all alterations, equivalents, and substitutes that fall within the idea and technical scope of the present disclosure.

It will be understood that, although the terms "first", "second", etc. may be used herein to describe various elements, the corresponding elements should not be understood to be limited by these terms, which are used only to distinguish one element from another. In addition, the terms particularly defined in consideration of the constructions and operations of the forms are provided to explain the exemplary forms, rather than to limit the scope of the present disclosure.

The terms used in this specification are provided only to explain specific forms, but are not intended to restrict the present disclosure. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meaning as commonly understood by a person having ordinary skill in the art to which the present disclosure pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

FIG. 1 is a schematic block diagram showing an autonomous vehicle according to one form of the present disclosure.

As shown in FIG. 1, the autonomous vehicle, denoted by reference numeral 10, may include a global-positioning-system (GPS) reception unit 100, a sensor unit 200, a map storage unit 300, a controller 400, and a driving unit 500.

Here, the terms, such as 'unit' 'controller' or 'module', etc., should be understood as a unit that processes at least one function or operation and that may be embodied in a hardware manner (e.g., a processor), a software manner, or a combination of the hardware manner and the software manner.

The GPS reception unit 100 may measure the current position of the autonomous vehicle 10 using a signal transmitted from a GPS satellite. The GPS reception unit 100 calculates the distance between the satellite and the GPS reception unit 100 using the difference between the time at which the satellite transmits a signal and the time at which the GPS reception unit 100 receives the signal. The GPS reception unit 100 calculates the current position of the autonomous vehicle 10 using the calculated distance between the satellite and the GPS reception unit 100 and information about the position of the satellite included in the transmitted signal. At this time, the GPS reception unit 100 may calculate the current position of the autonomous vehicle 10 using a triangulation method.

The sensor unit 200 may acquire information about the traveling state of the autonomous vehicle 10 and information about the traveling state of at least one adjacent vehicle 20 traveling in a lane adjacent to the traveling lane of the autonomous vehicle 10. In order to acquire the traveling state information of the autonomous vehicle 10 and the adjacent vehicle 20, the sensor unit 100 may include an out-of-vehicle information sensor 210 and an in-vehicle information sensor 230.

The out-of-vehicle information sensor 210 may include a camera sensor 211 for acquiring information about captured images of the surroundings of the autonomous vehicle 10 and a distance sensor 213 for acquiring information about the distance between the autonomous vehicle 10 and an object located in the vicinity of the autonomous vehicle 10. The distance sensor 213 may be implemented as a LIDAR or RADAR sensor. The out-of-vehicle information sensor 210 (hereinafter, referred to as a "first sensor" for the convenience of description) may collect out-of-vehicle information, such as the relative position, the relative velocity, and the orientation information of the adjacent vehicle 20 located within a predetermined detection range FR.

The camera sensor 211 may acquire information about images of the surroundings of the autonomous vehicle 10 through an image sensor, and may perform image processing, such as noise removal, with respect to the acquired images.

The distance sensor 213 may measure the arrival time of a laser pulse or an electromagnetic wave emitted toward the adjacent vehicle 20 in order to calculate the distance between the autonomous vehicle 10 and the adjacent vehicle 20.

The in-vehicle information sensor 230 (hereinafter, referred to as a "second sensor" for the convenience of description) may include a velocity sensor 231, an acceleration sensor 233, a yaw-rate sensor 235, and a steering angle sensor 237, and may measure in-vehicle information, such as the absolute velocity, the acceleration, the yaw rate, and the steering angle of the autonomous vehicle 10.

The map storage unit 300 may store information about a high-definition map, from which it is possible to distinguish between vehicle lanes, in the form of a database (DB). The high-definition map may be automatically and periodically updated through wireless communication, or may be manually updated by a user.

The map storage unit 300 may provide road shape data indicating the shape of a specific section of a road including the position of the road as a coordinate train. Here, in order to indicate the shape of the road, the road shape data displays opposite side boundary lines Q and S of the road and a center line R between the boundary lines Q and S as a set of dots, and displays longitudinal data and latitudinal data of each dot as coordinate values. In addition, the road shape data may provide information about the intercept orientation of each dot, i.e. information about the orientation of a line tangent to the curve of the road at each dot. Here, the intercept orientation information is displayed within a range of 0° to 360° in the clockwise direction on the assumption that the absolute orientation of due north is 0°.

The controller 400 may recognize the absolute position of the adjacent vehicle 20 based on the current position of the autonomous vehicle 10 received from the GPS reception unit 100 and the external information and the internal information of the autonomous vehicle 10 received from the sensor unit 200. Here, the adjacent vehicle 20 is a vehicle traveling in a lane adjacent to the traveling lane of the autonomous vehicle 10.

The controller 400 may match the current position of the autonomous vehicle 10 and the absolute position of the adjacent vehicle 20 on the high-definition map with reference to the road shape data, and may calculate the lateral velocity of the adjacent vehicle 20 in the road-width direction Y' and the longitudinal velocity of the adjacent vehicle 20 in the direction X' in which the adjacent lane extends.

The controller 400 may specify a road section L, displayed as a set of dots based on the longitudinal velocity of the adjacent vehicle 20, and may calculate a first path on the assumption that the offset of the adjacent vehicle 20 in the adjacent lane is maintained in the road-width direction Y'. Here, the road section L to be specified, which is a distance that is preset by a user, means the distance in the direction in which the lane extends, i.e. the longitudinal direction X'.

The controller 400 may apply the lateral velocity of the adjacent vehicle 20 to the first path in order to calculate a second path, which corresponds to a predicted traveling path of the adjacent vehicle 20, and may predict an interruption point (hereinafter, referred to as a "cut-in" point for the sake of convenience) of the adjacent vehicle 20 that attempts to enter the boundary line S between the traveling lane and the adjacent lane based on the second path.

The controller 400 may calculate the time TTC (Time to Crossing) desired for each of the autonomous vehicle 10 and the adjacent vehicle 20 to arrive at the predicted cut-in point, and may transmit a signal for controlling the driving of the autonomous vehicle 10 to the driving unit 500. Here, the control signal transmitted by the controller 400 may include a signal for controlling the velocity of the autonomous vehicle 10 such that at least one of deceleration, acceleration, or velocity maintenance is performed.

The driving unit 500 is configured to drive the autonomous vehicle 10 in response to the control signal transmitted by the controller 400, and may include components for actually driving the vehicle, such as a brake, an accelerator, a transmission, and a steering device. For example, in the case in which the control signal from the controller 400 is a signal indicating deceleration, the brake of the driving unit 500 may perform a deceleration operation.

Hereinafter, a method of calculating the lateral velocity of the adjacent vehicle 20 in the road-width direction Y' and the longitudinal velocity of the adjacent vehicle 20 in the direction X' in which the adjacent lane extends will be described with reference to FIG. 2.

Figure 2:
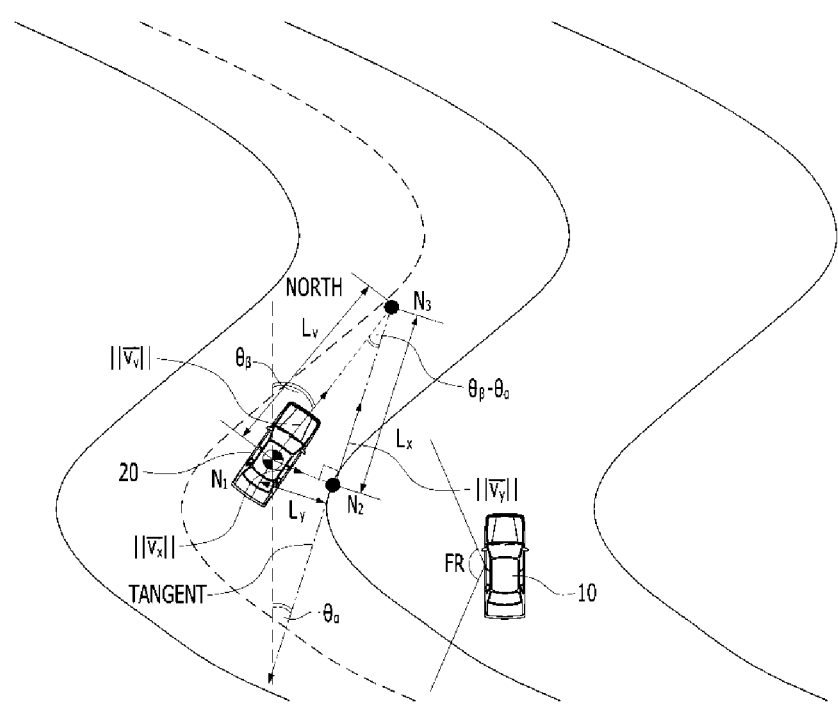
FIG. 2 is a view illustrating a method by which a controller calculates the lateral velocity and the longitudinal velocity of an adjacent vehicle based on a lane in one form of the present disclosure.

FIG. 2 is a view illustrating a method by which the controller calculates the lateral velocity and the longitudinal velocity of the adjacent vehicle based on a lane in one form of the present disclosure.

Referring to FIG. 2, the controller 400 may match the current position of the autonomous vehicle 10 and the absolute position of the adjacent vehicle 20 on the high-definition map with reference to the road shape data, and may calculate the absolute velocity, the absolute position, or the orientation information of the adjacent vehicle 20 traveling in the adjacent lane using the external information and the internal information of the autonomous vehicle 10 collected from the sensor unit 200.

For example, the controller 400 may calculate the absolute velocity, the absolute position, or the orientation information of the adjacent vehicle 20 in consideration of the relative velocity and the relative distance of the adjacent vehicle collected through the first sensor 210 and the absolute velocity or the steering angle of the autonomous vehicle 10 measured through the second sensor 230. Here, the orientation information means the absolute orientation in the direction in which the adjacent vehicle 20 advances, and the absolute orientation means the heading angle $\theta_\beta$ of the adjacent vehicle 20 that moves in the clockwise direction based on north.

The controller 400 may extract the boundary line S adjacent to the adjacent vehicle 20 matched on the high-definition map, and may the lateral velocity $\|\vec{V_y}\|$ of the adjacent vehicle 20 in the road-width direction Y' and the longitudinal velocity $\|\vec{V_x}\|$ of the adjacent vehicle 20 in the direction X' in which the adjacent lane extends using a triangulation method.

As shown in FIG. 2, the controller 400 may extract a second node $N_2$, located the shortest distance from the center of gravity (hereinafter, referred to as a "first node $N_1$") of the adjacent vehicle 20, from a set of dots of the adjacent boundary line S based on the first node $N_1$. In addition, the controller 400 may calculate a point at which an imaginary line extending from the first node $N_1$ in the direction in which the adjacent vehicle 20 advances and a line tangent to the adjacent boundary line S at the second node $N_2$ intersect each other (hereinafter, referred to as a "third node $N_3$"). The first to third nodes $N_1$, $N_2$, and $N_3$ may be displayed as coordinate values including longitudinal and latitudinal data.

At this time, the direction vector between the first node $N_1$ and the second node $N_2$ indicates the relative movement direction of the adjacent vehicle 20 in the road-width direction Y', and the direction vector between the second node $N_2$ and the third node $N_3$ indicates the relative movement direction of the adjacent vehicle 20 in the direction in which the adjacent lane extends. In addition, the lateral velocity $\|\vec{V_y}\|$ of the adjacent vehicle 20, a description of which will follow, may be defined as the traveling velocity of the adjacent vehicle 20 in the road-width direction Y', and the longitudinal velocity $\|\vec{V_x}\|$ of the adjacent vehicle 20 may be defined as the traveling velocity of the adjacent vehicle 20 in the direction X' in which the adjacent lane extends.

The controller 400 may calculate the lateral velocity $\|\vec{V_y}\|$ and the longitudinal velocity $\|\vec{V_x}\|$ of the adjacent vehicle 20 based on the absolute velocity of the adjacent vehicle 20 and on the linear distance between the first to third nodes $N_1$, $N_2$, and $N_3$. In an example, Equation 1 may be used.

$$\frac{\|\vec{V_v}\|}{L_v} = \frac{\|\vec{V_x}\|}{L_x} = \frac{\|\vec{V_y}\|}{L_y} \quad \text{[Equation 1]}$$

Here, Lv is the linear distance between the first node and the third node, $L_y$ is the linear distance between the second node and the third node, $L_x$ is the linear distance between the first node and the second node, and $\|\vec{V_v}\|$ is the absolute velocity of the adjacent vehicle.

In addition, the controller 400 may calculate the lateral velocity $\|\vec{V_y}\|$ and the longitudinal velocity $\|\vec{V_x}\|$ of the adjacent vehicle 20 based on the absolute velocity of the adjacent vehicle 20 and predetermined orientation information. In another example, Equation 2 may be used. Here, the predetermined orientation information includes information about the intercept orientation $\theta_\alpha$ of the second node $N_2$ and information about the heading angle $\theta_\beta$ of the adjacent vehicle 20.

$$\|\vec{V_x}\|=\|\vec{V_v}\|\cos(\theta_\beta-\theta_\alpha)$$

$$\|\vec{V_y}\|=\|\vec{V_v}\|\sin(\theta_\beta-\theta_\alpha) \qquad \text{[Equation 2]}$$

Here, $\|\vec{V_v}\|$ is the absolute velocity of the adjacent vehicle, $\theta_\alpha$ is the intercept orientation of the second node, ands $\theta_\beta$ is the heading angle of the adjacent vehicle.

Hereinafter, a method by which the controller calculates a first path, which corresponds to the longitudinal traveling path of the adjacent vehicle 20, will be described with reference to FIG. 3.

Figure 3:
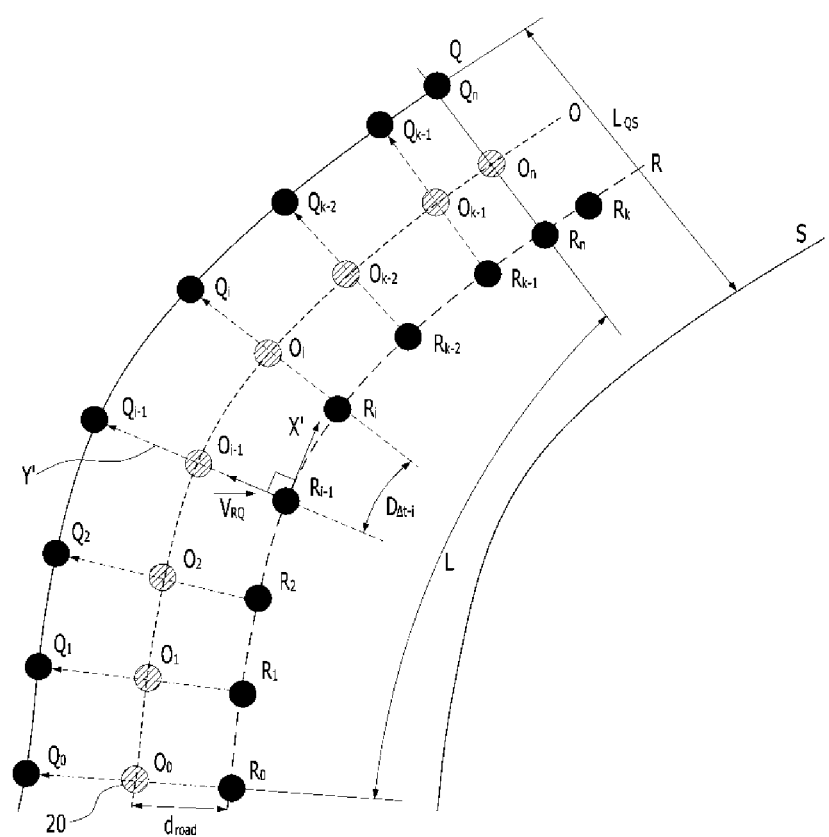
FIG. 3 is a view illustrating a method by which the controller calculates a first path based on the longitudinal velocity of the adjacent vehicle in one form of the present disclosure.

FIG. 3 is a view illustrating a method by which the controller calculates a first path based on the longitudinal velocity of the adjacent vehicle in one form of the present disclosure.

Referring to FIG. 3, the controller 400 may calculate a first path $\vec{O}$ with reference to the high-definition map information on the assumption that the offset of the adjacent vehicle 20 traveling in the adjacent lane, which is adjacent to the traveling lane of the autonomous vehicle 10, is maintained in the adjacent lane in the road-width direction Y'.

The controller 400 may receive the road shape data, which displays the boundary lines Q and S of each of the traveling lane and the adjacent lane and the center line R between the boundary lines Q and S as a set of dots, from the map storage unit 300.

The controller 400 may approximate a point corresponding to the absolute position of the adjacent vehicle 20 matched on the high-definition map to a reference node $O_0$ of the adjacent vehicle 20, and may calculate an offset distance $d_{road}$ of the reference node $O_0$ based on the center line of the adjacent lane.

Here, the offset distance $d_{road}$ is the distance that the reference node $O_0$ of the adjacent vehicle 20 moves rightwards or leftwards from the center line of the adjacent lane in a direction normal to the direction in which the adjacent lane extends (hereinafter, referred to as a "road-width direction" for the sake of convenience), and may satisfy $0 \leq d_{road} \leq L_{QS}/2$ (where $L_{QS}$ is the distance between the boundary lines of the adjacent lane).

In addition, the controller 400 may extract a reference node $R_0$ of the center line R located the shortest distance from the reference node $O_0$ of the adjacent vehicle 20 from a set of dots of the center line R, and may calculate node train vector information $\vec{R_0}, \vec{R_1}, \ldots, \vec{R_k}$ with respect to the center line R in consideration of the longitudinal velocity $\|\vec{V_x}\|$ of the adjacent vehicle 20 and a predetermined period t.

At this time, the longitudinal movement distance $D_{t\_i}$ between respective nodes $R_0, R_1, \ldots,$ and $R_k$ of the center line R may be defined by Equation 3.

$$D_{\Delta t\_i}=\|\vec{V_x}\|\times\Delta t_i \qquad \text{[Equation 3]}$$

Here, $D_{t\_i}$ is the longitudinal movement distance between node $R_{i-1}$ and node $R_i$ (where i is an integer of 1 or more), $\|\vec{V_x}\|$ is the longitudinal velocity of the adjacent vehicle 20, and $t_i$ is the time desired to move from node $R_{i-1}$ to node $R_i$. At this time, $t_i$ may be a time that is preset by a user as a predetermined period, and the node train vector information $\vec{R_0}, \vec{R_1}, \ldots, \vec{R_k}$ with respect to the center line R may provide equally spaced road shape data.

Meanwhile, the controller 400 may predict the cut-in point of the adjacent vehicle 20 in units of a predetermined road section L. The reason for this is that it is desired to efficiently predict the cut-in point of the adjacent vehicle 20 within the limited data-processing ability range of the controller 400. Here, the predetermined road section L is a longitudinal distance that is preset by the user in the direction X' in which the adjacent lane extends.

The controller 400 may specify the predetermined road section L based on the node train vector information R0, $\vec{R_1}, \ldots, \vec{R_k}$ with respect to the center line R. At this time, the controller 400 may calculate k satisfying Equation 4 and node $R_n$ located at the terminal of the road section L between node $R_{k-1}$ and node $R_k$, and may extract node train vector information $\vec{R_0}, \vec{R_1}, \ldots, \vec{R_{k-1}}, \vec{R_n}$ with respect to the center line R that is present within the road section L.

$$\sum_{i=1}^{k-1}D_{\Delta t\_i} < L < \sum_{i=1}^{k}D_{\Delta t\_i}, \ L = \sum_{i=1}^{k-1}D_{\Delta t\_i} + D_{\Delta t\_n} \qquad \text{[Equation 4]}$$

Here, k is an integer of 1 or more, n satisfies k−1<n<k, and $D_{t\_n}$ is the longitudinal distance between node $R_n$ and node $R_{k-1}$.

In addition, the controller 400 may calculate a first path $\vec{O}$ using Equation 5 in consideration of the extracted node train vector information $\vec{R_0}, \vec{R_1}, \ldots, \vec{R_{k-1}}, \vec{R_n}$ with respect to the center line R on the assumption that the adjacent vehicle 20 travels in the adjacent lane in the state of maintaining the offset distance $d_{road}$ in the road-width direction Y'.

$$\vec{O_i}=d_{road}\vec{V_{RQ}}+\vec{R_i}(1\leq i\leq n) \qquad \text{[Equation 5]}$$

Here, $d_{road}$ is the offset distance with respect to the center line R, $\vec{V_{RQ}}$ is an offset direction vector, $\vec{R_i}$ is information about each node train vector with respect to the center line R, and the offset direction vector $\vec{V_{RQ}}$ is a unit vector at each of the nodes $R_0, R_1, \ldots, R_{k-1},$ and $R_n$ of the center line R in the road-width direction Y'.

The first path $\vec{O}$ includes node train vector information $\vec{O_0}, \vec{O_1}, \ldots, \vec{O_{k-1}}, \vec{O_n}$ an with respect to the longitudinal traveling path of the adjacent vehicle 20 within the predetermined road section L, and each of the nodes $O_0, O_1, \ldots, O_{k-1},$ and $O_n$ of the first path $\vec{O}$ may be spaced apart from a corresponding one of the nodes $R_0, R_1, \ldots, R_{k-1},$ and $R_n$ of the center line R by the offset distance $d_{road}$ in the road-width direction. In the case in which the offset distance $d_{road}$ is 0, however, the first path $\vec{O}$ may correspond to the node train vector information $\vec{R_0}, \vec{R_1}, \ldots, \vec{R_{k-1}}, \vec{R_n}$ with respect to the center line R.

Hereinafter, a method by which the controller calculates a second path, which corresponds to a predicted traveling path of the adjacent vehicle 20, will be described with reference to FIG. 4.

Figure 4:
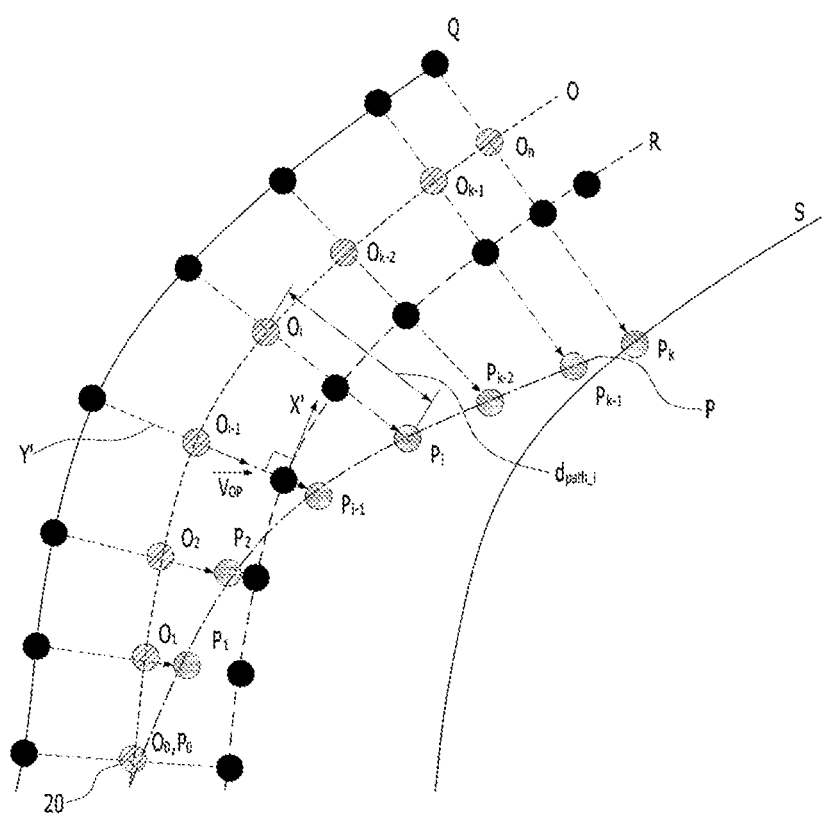
FIG. 4 is a view illustrating a method by which the controller calculates a second path in consideration of the first path calculated in FIG. 3 and the lateral velocity of the adjacent vehicle in one form of the present disclosure.

FIG. 4 is a view illustrating a method by which the controller calculates a second path in consideration of the first path calculated in FIG. 3 and the lateral velocity of the adjacent vehicle in one form of the present disclosure.

Referring to FIG. 4, the controller 400 may apply the lateral velocity $\|\vec{V}_y\|$ of the adjacent vehicle 20 to the first path $\vec{O}$, which corresponds to the longitudinal traveling path of the adjacent vehicle 20, with reference to the high-definition map information in order to calculate a second path $\vec{P}$, which corresponds to a predicted traveling path of the adjacent vehicle 20.

The controller 400 may calculate the lateral movement distance $d_{path\_i}$ of the adjacent vehicle 20 in the road-width direction Y' at each of the nodes $O_0, O_1, \ldots, O_{k-1}$, and $O_n$ of the first path $\vec{O}$ and may calculate a second path $\vec{P}$ including node train vector information $\vec{P}_0, \vec{P}_1, \ldots, \vec{P}_{k-1}, \vec{P}_n$ with respect to the predicted traveling path of the adjacent vehicle 20 in consideration of the node train vector information $\vec{O}_0, \vec{O}_1, \ldots, \vec{O}_{k-1}, \vec{O}_n$ with respect to the longitudinal traveling path of the adjacent vehicle 20, the lateral movement distance $d_{path\_i}$ of the adjacent vehicle 20, and an advance direction vector $\vec{V}_{OP}$ of the adjacent vehicle 20. Here, node $O_0$ of the first path $\vec{O}$ and node $P_0$ of the second path $\vec{P}$ include the same longitudinal and latitudinal data as the coordinate values.

The lateral movement distance $d_{path\_i}$ may be calculated by applying the lateral velocity $\|\vec{V}_y\|$ of the adjacent vehicle 20 to the time $t_i$ desired for the adjacent vehicle 20 to move from node $O_i$ to node $P_i$, and may be defined by Equation 6.

$$d_{path\_i} = t_i \times \|\vec{V}_y\|, (1 \le i \le n) \quad \text{[Equation 6]}$$

Here, the time $t_i$ desired for the adjacent vehicle 20 to move from node $O_i$ to node $P_i$ in the lateral direction is the same as the time $t_i$ desired for the adjacent vehicle 20 to move from node $O_0$ to node $O_i$ in the longitudinal direction, and may be calculated using Equation 7.

$$t_i \begin{cases} t_x = \sum_{i=1}^{x} \Delta t_i, (1 \le x \le k-1) \\ t_n = \sum_{i=1}^{k-1} \Delta t_i + \Delta t_n, \Delta t_n = \dfrac{L - \sum_{i=1}^{k-1} D_{\Delta t\_i}}{\|\vec{V}_x\|}, (k-1 < n < k) \end{cases} \quad \text{[Equation 7]}$$

Here, $t_x$ is the time desired for the adjacent vehicle 20 to move from node $O_x$ to node $P_x$ in the lateral direction, $t_n$ is the time desired for the adjacent vehicle 20 to move from node $O_n$, which is located at the terminal of the road section L, to node $P_n$ in the lateral direction, $t_i$ is the time desired for the adjacent vehicle 20 to move from $O_{i-1}$ (or node $R_{i-1}$) to node $O_i$ (or node $R_i$), and $\|\vec{V}_x\|$ is the longitudinal velocity of the adjacent vehicle 20.

The advance direction vector $\vec{V}_{OP}$ of the adjacent vehicle 20 is a unit vector of the adjacent vehicle 20 in the road-width direction with respect to the direction in which the adjacent vehicle 20 is advancing. At this time, the advance direction vector $\vec{V}_{OP}$ of the adjacent vehicle 20 may have the same scalar as the above-described offset direction vector $\vec{V}_{RQ}$, and the directions thereof may be the same as or opposite each other. For example, the advance direction vector $\vec{V}_{OP}$ and the offset direction vector $\vec{V}_{RQ}$ of the adjacent vehicle 20 may satisfy the correlation $\vec{V}_{RQ} = \pm \vec{V}_{OP}$, where "+" indicates the same direction and "−" indicates opposite directions.

The controller 400 may calculate a second path $\vec{P}$, which corresponds to a predicted traveling path of the adjacent vehicle 20, in consideration of the first path $\vec{O}$ calculated on the assumption that the offset of the adjacent vehicle 20 in the adjacent lane is maintained in the road-width direction Y', the lateral movement distance $d_{path\_i}$ of the adjacent vehicle 20, and the advance direction vector $\vec{V}_{OP}$ of the adjacent vehicle 20. The second path $\vec{P}$ may be defined by Equation 8.

$$\begin{aligned}\vec{P}_i &= d_{path\_i} \vec{V}_{OP} + \vec{O}_i \\ &= (d_{path\_i} \pm d_{road}) \vec{V}_{OP} + \vec{R}_i, (1 \le i \le n)\end{aligned} \quad \text{[Equation 8]}$$

Here, $\vec{O}_i$ is the first path including the node train vector information with respect to the longitudinal traveling path of the adjacent vehicle 20, $d_{path\_i}$ is the lateral movement distance from node $O_i$ to node $P_i$, $\vec{V}_{OP}$ is the advance direction vector of the adjacent vehicle 20, $d_{road}$ is the offset distance with respect to the center line R, and $\vec{R}_i$ is information about each node train vector with respect to the center line R. Equation 8 may be derived with reference to Equation 5 above and the correlation $\vec{V}_{RQ} = \pm \vec{V}_{OP}$.

Hereinafter, a method of predicting a cut-in point of the adjacent vehicle 20 that attempts to enter the boundary line between the traveling lane and the adjacent lane based on the second path and calculating the time desired for each of the autonomous vehicle 10 and the adjacent vehicle 20 to arrive at the predicted cut-in point will be described with reference to FIG. 5.

Figure 5:
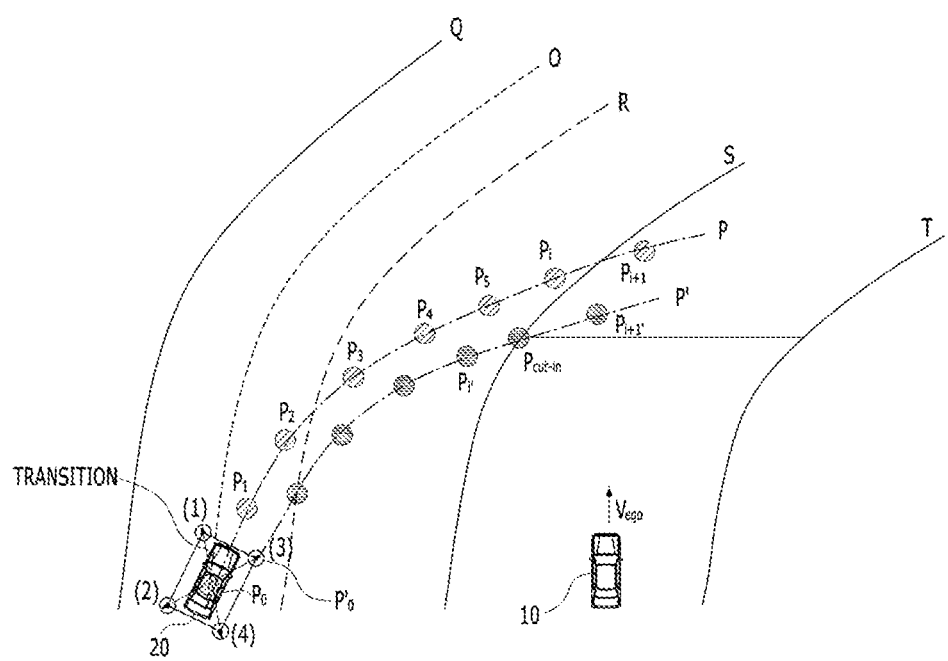
FIG. 5 is a view illustrating a method by which the controller predicts a cut-in point of the adjacent vehicle based on the second path calculated in FIG. 4 in another form of the present disclosure.

FIG. 5 is a view illustrating a method by which the controller predicts a cut-in point of the adjacent vehicle based on the second path $\vec{P}$ calculated in FIG. 4 in another form of the present disclosure.

Referring to FIG. 5, the controller 400 may predict a cut-in point of the adjacent vehicle that attempts to enter the boundary line S between the traveling lane and the adjacent lane based on the second path $\vec{P}$.

The controller 400 may extract the coordinates of a feature point $P_0'$ of the adjacent vehicle 20 in consideration of the out-of-vehicle information acquired through the first sensor 210 (for example, information about the overall width and the overall length of the adjacent vehicle 20), and may transit the reference node $O_0$ of the adjacent vehicle 20 to the feature point coordinates $P_0'$. In addition, the controller 400 may move the second path $\vec{P}$ parallel based on the transited coordinates of the feature point $P_0'$. Here, the feature point $P_0'$ may include corner regions 1, 2, 3, and 4 of the adjacent vehicle 20, with which the autonomous vehicle 10 has a high possibility of colliding.

The controller 400 may calculate at least one intersection point $P_{cut-in}$ between at least one second path $\vec{P'}$ that has been moved parallel and the boundary line S between the traveling lane of the autonomous vehicle and the adjacent lane with reference to the high-definition map information, and may predict the intersection point $P_{cut-in}$ as a cut-in point $P_{cut-in}$ of the adjacent vehicle 20.

The controller 400 may extract node $P_i'$, which is located in the adjacent lane in the state of being adjacent to the boundary line S, and node $P_{i+1}'$, which is located in the traveling lane in the state of being adjacent to the boundary line S, from among nodes $P_0'$, $P_1'$, ..., and $P_n'$ of the at least one second path $\vec{P'}$ that has been moved parallel.

The controller 400 may calculate a first time $t_{cut-in}$ desired for the adjacent vehicle 20 to arrive at the predicted cut-in point $P_{cut-in}$ based on node $P_i'$ and node $P_{i+1}'$, which are adjacent to the boundary line S, and the cut-in point $P_{cut-in}$. The first time $t_{cut-in}$ may be defined by Equation 9.

[Equation 9]

$$t_{cut-in} = \frac{d_{(P_i, P_{cut-in})}}{d_{(P_i, P_{i+1})}}(t_{i+1} - t_i) + t_i$$

Here, $d_{(P_i, P_{cut-in})}$ is the distance between node $P_i$ and the intersection point $P_{cut-in}$, $d_{(P_i, P_{i+1})}$ is the distance between node $P_i$ and node $P_{i+1}$, $t_i$ is the time desired for the adjacent vehicle 20 to move to node $P_i$, and $t_{i+1}$ is the time desired for the adjacent vehicle 20 to move to node $P_{i+1}$. At this time, $t_i$ (or $t_{i+1}$) may be the same as the time desired for the adjacent vehicle 20 to move from node $O_i$ (or node $O_{i+1}$) to node $P_i$ (or node $P_{i+1}$) in the lateral direction, calculated by Equation 7 above.

The controller 400 may calculate a second time $t_{ego}$ desired for the autonomous vehicle 10 to arrive at the predicted cut-in point $P_{cut-in}$ based on the absolute velocity $V_{ego}$ of the autonomous vehicle 10 acquired through the second sensor 230. The second time $t_{ego}$ may be defined by Equation 10.

$$t_{ego} = \frac{d_{(P_{ego}, P_{cut-in})}}{V_{ego}} \qquad \text{[Equation 10]}$$

Here, $d_{(P_{ego}, P_{cut-in})}$ is the distance between the current position $P_{ego}$ of the autonomous vehicle 10 and the intersection point $P_{cut-in}$, and $V_{ego}$ is the absolute velocity $V_{ego}$ of the autonomous vehicle 10.

The controller 400 may compare the calculated first time $t_{cut-in}$ and the calculated second time $t_{ego}$ with each other to predict whether a collision between the autonomous vehicle 10 and the adjacent vehicle 20 will occur, and may transmit a signal for driving the autonomous vehicle 10 to the driving unit 500.

In the case in which the first time $t_{cut-in}$ is equal to or larger than the second time $t_{ego}$, the controller 400 may perform control such that the velocity of the autonomous vehicle 10 is increased or maintained in order to prevent a collision with the adjacent vehicle 20.

In the case in which the first time $t_{cut-in}$ is smaller than the second time $t_{ego}$, the controller 400 may determine that the adjacent vehicle 20 is a potential cut-in vehicle, and may perform control to decelerate the autonomous vehicle 10.

As previously described, the autonomous vehicle 10 according to the exemplary forms of the present disclosure is capable of accurately predicting the traveling path of the adjacent vehicle 20 based on the high-definition map information and establishing the traveling strategy of the autonomous vehicle in advance based on the predicted traveling path, whereby the traveling stability of the autonomous vehicle may be improved.

In addition, the autonomous vehicle 10 according to the forms of the present disclosure is capable of predicting the traveling path of the adjacent vehicle 20 based on the longitudinal velocity and the lateral velocity of the adjacent vehicle 20, calculated with reference to the road shape data on the traveling lane or the adjacent lane, whereby it is possible to accurately determine the intention of the adjacent vehicle 20 that attempts to cut in on a straight road and/or a curved road and to calculate the cut-in point of the adjacent vehicle 20 in advance, and therefore stable deceleration or acceleration control may be performed.

Figure 6:
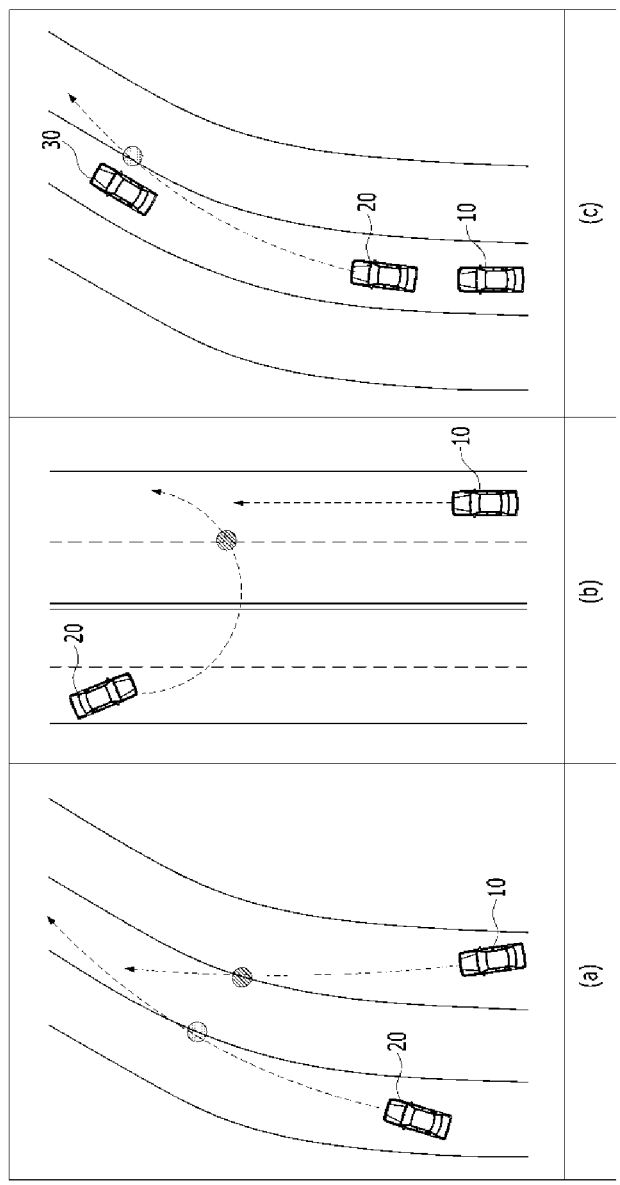
FIG. 6 is a view illustrating an example of application of the autonomous vehicle in one form of the present disclosure.
Figure 7:
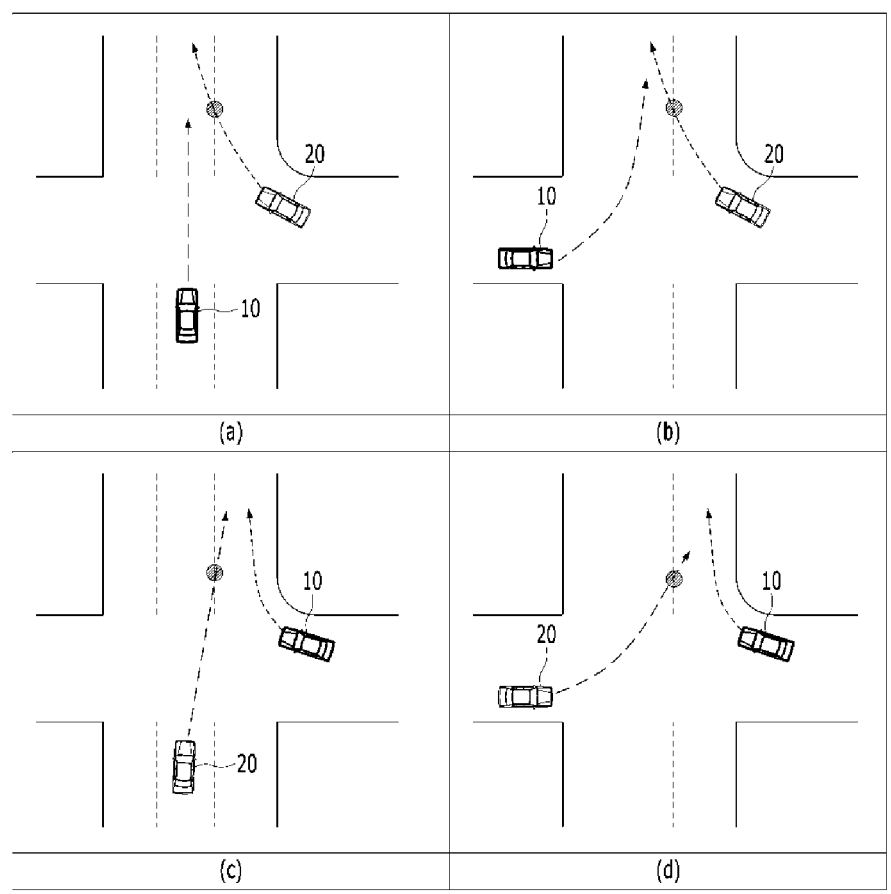
FIG. 7 is a view illustrating an example of application of the autonomous vehicle in one form of the present disclosure in the case in which the autonomous vehicle is located at an intersection.

Meanwhile, the autonomous vehicle 10 according to the previous form of the present disclosure may be applied to the various traveling situations shown in FIGS. 6 and 7. This will be described with reference to FIGS. 6 and 7.

FIG. 6 is a view illustrating an example of application of the autonomous vehicle according to the form of the present disclosure.

FIG. 6(a) is a view showing the traveling situation in which the adjacent vehicle 20 simultaneously attempts to cut into the lane that the autonomous vehicle attempts to enter on a curved road.

Referring to FIG. 6(a), in the case in which the adjacent vehicle 20 attempts to cut into the lane that the autonomous vehicle 10 attempts to enter on a curved road, the autonomous vehicle 10 may predict the cut-in point of the adjacent vehicle 20, and may establish a strategy for avoiding a collision with the adjacent vehicle 20.

FIG. 6(b) is a view showing the traveling situation in which the adjacent vehicle 20 in the opposite lane attempts a U-turn into the traveling lane of the autonomous vehicle.

Referring to FIG. 6(b), in the case in which the adjacent vehicle 20 in the opposite lane attempts to a U-turn into the traveling lane of the autonomous vehicle on a straight road, the autonomous vehicle 10 may predict the cut-in point of the adjacent vehicle 20, and may establish a strategy for avoiding a collision with the adjacent vehicle 20.

Upon sensing the adjacent vehicle 20 in the opposite lane through the first sensor 210, the controller 400 may predict the traveling path of the adjacent vehicle 20 or whether the adjacent vehicle 20 will cut in based on the lateral velocity and the longitudinal velocity of the adjacent vehicle 20 in the adjacent lane, and may establish a traveling strategy that is flexible depending on the traveling conditions of the adjacent vehicle 20. For example, the controller 400 may calculate the time TTC desired for each of the autonomous vehicle 10 and the adjacent vehicle 20 to arrive at the predicted cut-in point, and may preset a specific control signal for decelerating or accelerating the autonomous vehicle 10.

FIG. 6(c) is a view showing the traveling situation in which a preceding vehicle and a further preceding vehicle are present ahead of the autonomous vehicle in the traveling lane.

Referring to FIG. 6(c), in the case in which a preceding vehicle 20 and a further preceding vehicle 30 are present ahead of the autonomous vehicle 10 in the traveling lane, the autonomous vehicle 10 according to the form of the present disclosure may predict a cut-out point of the previous vehicle 20, and may establish a strategy for avoiding a collision with the further preceding vehicle 30.

Upon sensing the preceding vehicle 20 located ahead of the autonomous vehicle 10 in the traveling lane through the first sensor 210, the controller 400 may calculate the lateral velocity of the preceding vehicle 20 in the traveling lane in the road-width direction and the longitudinal velocity of the preceding vehicle 20 in the direction in which the traveling lane extends, and may predict the cut-out point of the previous vehicle 20, in the same method as was described with reference to FIGS. 3 to 5. Here, the method of predicting the cut-out point is substantially identical to the method of predicting the cut-in point, except that the cut-out point or the cut-in point is predicted depending on whether the preceding vehicle 20 is located in the traveling lane of the autonomous vehicle or in the adjacent lane, and therefore a duplicative description thereof will be omitted.

The controller may predict the traveling path of the preceding vehicle 20 or whether the preceding vehicle 20 will cut out based on the lateral velocity and the longitudinal velocity of the preceding vehicle 20 in the traveling lane, and may establish a traveling strategy that is flexible depending on the traveling conditions of the further preceding vehicle 30, acquired through the first sensor 210. For example, the controller 400 may preset a specific control signal for decelerating or accelerating the autonomous vehicle 10 based on the relative velocity of the further preceding vehicle 30.

FIG. 7 is a view illustrating an example of application of the autonomous vehicle in one form of the present disclosure in the case in which the autonomous vehicle is located at an intersection.

FIGS. 7(a) and 7(b) are views showing the situation in which the adjacent vehicle 20 attempts to cut into the traveling lane of the autonomous vehicle 10 that enters the intersection (goes straight ahead or turns left) while turning right.

Upon sensing the adjacent vehicle 20 that turns right at the intersection through the first sensor 210, the controller 400 may predict the traveling path of the adjacent vehicle 20 or whether the adjacent vehicle 20 will cut in based on the lateral velocity and the longitudinal velocity of the adjacent vehicle 20 in the adjacent lane, and may establish a traveling strategy that is flexible depending on the traveling conditions of the adjacent vehicle 20, as previously described. For example, the controller 400 may calculate the time TTC desired for each of the autonomous vehicle 10 and the adjacent vehicle 20 to arrive at the predicted cut-in point, and may preset a specific control signal for decelerating or accelerating the autonomous vehicle 10 or for applying torque in the direction in which a collision with the adjacent vehicle 20 is avoided (for example, in the leftward direction).

FIGS. 7(c) and 7(d) are views showing the situation in which the adjacent vehicle that enters the intersection (goes straight ahead or turns left) attempts to cut into the traveling lane of the adjacent vehicle that turns right at the intersection.

Upon sensing the adjacent vehicle 20 that enters the intersection (goes straight ahead or turns left) through the first sensor 210, the controller 400 may predict the traveling path of the adjacent vehicle 20 or whether the adjacent vehicle will cut in based on the lateral velocity and the longitudinal velocity of the adjacent vehicle 20 in the adjacent lane, and may establish a traveling strategy that is flexible depending on the traveling conditions of the adjacent vehicle 20, as previously described. For example, the controller 400 may calculate the time TTC desired for each of the autonomous vehicle 10 and the adjacent vehicle 20 to arrive at the predicted cut-in point, and may preset a specific control signal for decelerating or accelerating the autonomous vehicle 10.

Figure 8:
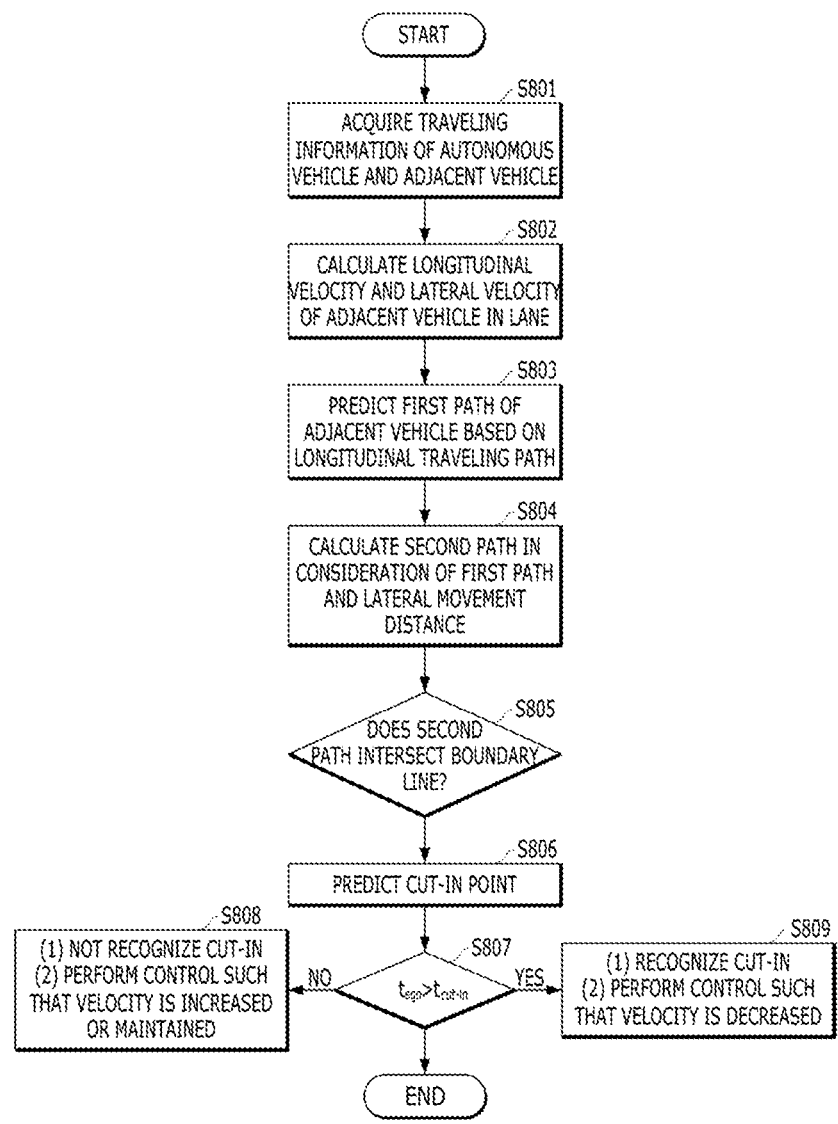
FIG. 8 is a flowchart illustrating a vehicle running control method in one form of the present disclosure.

FIG. 8 is a flowchart illustrating a vehicle running control method in one form of the present disclosure.

Referring to FIG. 8, the controller 400 may acquire information about the traveling states of the autonomous vehicle and the adjacent vehicle through the GPS reception unit 100, the sensor unit 200, and the map storage unit 300 (S801).

At step S801, the controller 400 may calculate the relative position, the relative velocity, and the relative acceleration of the adjacent vehicle based on at least one of the image information or the distance information received from the out-of-vehicle information sensor 210. In addition, the controller 400 may calculate the absolute position, the absolute velocity, and the absolute acceleration of the adjacent vehicle in further consideration of at least one of the position information or the vehicle information of the autonomous vehicle received from the GPS reception unit 100 and the in-vehicle information sensor 230.

Subsequently, the controller 400 may match the current position of the autonomous vehicle and the absolute position of the adjacent vehicle on the high-definition map with reference to the road shape data acquired through the map storage unit 300, and may determine the adjacent lane in which the adjacent vehicle travels in order to calculate the lateral velocity $\|\vec{V_y}\|$ of the adjacent vehicle 20 in the road-width direction and the longitudinal velocity $\|\vec{V_x}\|$ of the adjacent vehicle 20 in the direction in which the adjacent lane extends (S802).

The controller 400 may specify a road section L displayed as a set of dots based on the longitudinal velocity $\|\vec{V_x}\|$ of the adjacent vehicle, and may calculate a first path $\vec{O}$ on the assumption that the offset of the adjacent vehicle in the adjacent lane is maintained in the road-width direction (S803). Here, the road section L to be specified, which is a distance that is preset by a user, means the longitudinal distance in the direction in which the lane extends.

The controller 400 may calculate a second path $\vec{P}$, which corresponds to a predicted traveling path of the adjacent vehicle, in consideration of the first path $\vec{O}$, the lateral movement distance $d_{path\_i}$ of the adjacent vehicle, and the advance direction vector $\vec{V_{OP}}$ of the adjacent vehicle (S804). Here, the lateral movement distance $d_{path\_i}$ may be calculated by applying the lateral velocity $\|\vec{V_y}\|$ of the adjacent vehicle to the time desired for the adjacent vehicle to move from the first path $\vec{O}$ to the second path $\vec{P}$, and the advance direction vector $\vec{V_{OP}}$ of the adjacent vehicle may be defined as a unit vector of the adjacent vehicle in the road-width direction with respect to the direction in which the adjacent vehicle is advancing.

The controller 400 may determine whether the second path $\vec{P}$, which corresponds to the predicted traveling path of the adjacent vehicle, calculated at step S804, intersects the boundary line S between the traveling lane and the adjacent lane with reference to the high-definition map information (S805).

Upon determining that there is no intersection point between the second path $\vec{P}$ and the boundary line S (NO in S805), the procedure may return to step S801.

Upon determining that there is an intersection point between the second path $\vec{P}$ and the boundary line S (YES in S805), the controller 400 may predict the intersection point as a cut-in point $P_{cut-in}$ of the adjacent vehicle (S806).

Subsequently, the controller 500 may compare the time TTC desired for the autonomous vehicle 10 to arrive at the predicted cut-in point and the time TTC desired for the adjacent vehicle 20 to arrive at the predicted cut-in point with each other, and may transmit a signal for controlling the driving of the autonomous vehicle to the driving unit 500 (S807).

In the case in which the first time $t_{cut-in}$ desired for the adjacent vehicle to arrive at the predicted cut-in point $P_{cut-in}$ is equal to or larger than the second time $t_{ego}$ desired for the autonomous vehicle to arrive at the predicted cut-in point $P_{cut-in}$ (NO in S807), the controller 400 may not recognize that the adjacent vehicle is cutting in, and may perform control such that the velocity of the autonomous vehicle is increased or maintained in order to prevent a collision with the adjacent vehicle (S808).

In the case in which the first time $t_{cut-in}$ is shorter than the second time $t_{ego}$ (YES in S807), the controller 400 may determine that the adjacent vehicle is a potential cut-in vehicle, and may perform control to decelerate the autonomous vehicle (S809).

The vehicle running control method according to the forms of the present disclosure described above may be implemented as a program that can be executed by a computer and stored in a computer-readable recording medium. Examples of the computer-readable recording medium include ROM, RAM, CD-ROM, magnetic tape, a floppy disk, and an optical data storage device.

The computer-readable recording medium may be distributed to a computer system connected over a network, and computer-readable code may be stored and executed thereon in a distributed manner. Functional programs, code, and code segments for implementing the method described above may be easily inferred by programmers in the art to which at least one form pertains.

Although only a few forms have been described above, various other forms may be provided. The above forms may be combined in various manners unless they are incompatible, and new forms may be realized therethrough.

As is apparent from the above description, according to at least one form of the present disclosure, the traveling path may be estimated based on the longitudinal velocity and the lateral velocity of an adjacent vehicle calculated with reference to the traveling lane or the road shape, whereby it is possible to more accurately predict whether the traveling lane of the adjacent vehicle will be changed and thus to flexibly respond to various road situations.

Consequently, it is possible to prevent the flow of traffic from being hindered due to indiscriminate deceleration in an autonomous traveling situation and to reduce the discomfort of drivers and passengers in adjacent vehicles.

It will be appreciated by those skilled in the art that the effects achievable through the present disclosure are not limited to what have been particularly described hereinabove and that other effects of the present disclosure will be more clearly understood from the above detailed description.

It will be apparent to those skilled in the art that various modifications and variations can be made in the present disclosure without departing from the spirit or scope of the present disclosure. Consequently, the above detailed description is not to be construed as limiting the present disclosure in any aspect, and is to be considered by way of example. The scope of the present disclosure should be determined by reasonable interpretation of the accompanying claims, and all equivalent modifications made without departing from the scope of the present disclosure should be understood to be included in the scope of the following claims.

What is claimed is:

1. A vehicle running control method, comprising:
    calculating, by a controller, a lateral velocity of an adjacent vehicle that travels in an adjacent lane adjacent to a traveling lane in which an autonomous vehicle travels in a road-width direction, and a longitudinal velocity of the adjacent vehicle in a direction in which the adjacent lane extends;
    specifying, by the controller, a predetermined road section based on the longitudinal velocity and calculating a first path based on an assumption that an offset distance of the adjacent vehicle in the adjacent lane in the road-width direction is maintained within the predetermined road section;
    calculating, by the controller, a second path by applying a lateral movement distance of the adjacent vehicle and an advance direction vector of the adjacent vehicle to the first path and the second path corresponding to a predicted traveling path of the adjacent vehicle, wherein the advance direction vector is a unit vector of the adjacent vehicle in the road-width direction with respect to a direction in which the adjacent vehicle is advancing;
    tracking the second path to determine whether the second path intersects a boundary line between the traveling lane and the adjacent lane; and
    predicting a cut-in point of the adjacent vehicle based on an intersection point between the second path and the boundary line,
    wherein predicting the cut-in point comprises:
        extracting coordinates of a feature point of the adjacent vehicle, the feature point including corner regions of the adjacent vehicle;
        transiting coordinates of a reference node of the adjacent vehicle to the coordinates of the feature point, the reference node to which a point corresponding to an absolute position of the adjacent vehicle is approximated;
        parallelly moving the second path based on the transited coordinates of the reference node;
        calculating the intersection point between the moved second path and the boundary line; and
        predicting the calculated intersection point as the cut-in point of the adjacent vehicle.

2. The vehicle running control method according to claim 1, wherein the first path is calculated based on map information comprising: a plurality of dots indicative of a center line between boundary lines of each of the traveling lane and the adjacent lane, and the boundary lines of the traveling lane and the adjacent lane.

3. The vehicle running control method according to claim 1, further comprising: controlling driving of the autonomous vehicle based on a time desired for each of the autonomous vehicle and the adjacent vehicle to arrive at the predicted cut-in point.

4. The vehicle running control method according to claim 3, wherein controlling the driving of the autonomous vehicle comprises:
- accelerating the autonomous vehicle when a first arrival time of the autonomous vehicle exceeds a second arrival time of the adjacent vehicle;
- determining that the adjacent vehicle is a potential cut-in vehicle, and
- decelerating the autonomous vehicle when the first arrival time of the autonomous vehicle is equal to or less than the second arrival time of the adjacent vehicle.

5. An autonomous vehicle comprising:
- a sensor configured to acquire traveling state information of the autonomous vehicle and traveling state information of an adjacent vehicle that travels in an adjacent lane adjacent to a traveling lane in which the autonomous vehicle travels;
- a map storage configured to provide map information comprising
  - a plurality of dots indicative of a center line between boundary lines of each of the traveling lane and the adjacent lane; and
- a controller configured to calculate a lateral velocity of the adjacent vehicle in a road-width direction and a longitudinal velocity of the adjacent vehicle in a direction in which the adjacent lane extends with reference to the traveling state information and the map information, wherein the controller is configured to:
- specify a predetermined road section based on the longitudinal velocity,
- calculate a first path based on an assumption that an offset distance of the adjacent vehicle in the adjacent lane in the road-width direction is maintained within the predetermined road section,
- calculate a second path by applying a lateral movement distance of the adjacent vehicle and an advance direction vector of the adjacent vehicle to the first path, the second path corresponding to a predicted traveling path of the adjacent vehicle, wherein the advance direction vector is a unit vector of the adjacent vehicle in the road-width direction with respect to a direction in which the adjacent vehicle is advancing,
- track the second path and determine whether the second path intersects a boundary line between the traveling lane and the adjacent lane, and
- extract coordinates of a feature point of the adjacent vehicle, the feature point corresponding to an outmost corner region, among corner regions of the adjacent vehicle, which is closest to the boundary line,
- transit coordinates of a reference node of the adjacent vehicle to the coordinates of the feature point, the reference node to which a point corresponding to an absolute position of the adjacent vehicle is approximated,
- parallelly move the second path based on the transited coordinates of the reference node;
- calculate an intersection point at which the moved second path intersects the boundary line; and
- determine the calculated intersection point as a predicted cut-in point of the adjacent vehicle.

6. The autonomous vehicle according to claim 5, wherein the controller is configured to control driving of the autonomous vehicle based on a time desired for each of the autonomous vehicle and the adjacent vehicle to arrive at the predicted cut-in point.

7. The autonomous vehicle according to claim 6, wherein the controller is configured to:
- perform acceleration of the autonomous vehicle when a first arrival time of the autonomous vehicle exceeds a second arrival time of the adjacent vehicle,
- determine that the adjacent vehicle is a potential cut-in vehicle, and
- perform deceleration of the autonomous vehicle when the first arrival time of the autonomous vehicle is equal to or less than the second arrival time of the adjacent vehicle.

* * * * *